United States Patent [19]
Abramsohn

[11] Patent Number: 5,404,202
[45] Date of Patent: Apr. 4, 1995

[54] APPARATUS FOR REGISTERING IMAGES IN A XEROGRAPHIC SYSTEM

[75] Inventor: Dennis A. Abramsohn, Pittsford, N.Y.

[73] Assignee: Xerox Corporation, Stamford, Conn.

[21] Appl. No.: 128,166

[22] Filed: Sep. 29, 1993

[51] Int. Cl.6 ............................................. G03G 21/00
[52] U.S. Cl. ..................................... 355/208; 226/28; 250/548
[58] Field of Search ............... 355/208, 211, 212, 207; 226/27, 28, 45; 324/246, 457, 458; 250/491.1, 548; 356/399, 400, 401

[56] References Cited

U.S. PATENT DOCUMENTS

| | | | |
|---|---|---|---|
| 4,808,832 | 2/1989 | Doggett | 250/548 |
| 5,175,570 | 12/1992 | Haneda et al. | 346/160 |
| 5,200,285 | 4/1993 | Carrish | 346/155 |
| 5,208,633 | 5/1993 | Genovese | 355/212 |
| 5,208,796 | 5/1993 | Wong et al. | 369/97 |
| 5,214,493 | 5/1993 | Sugiyama et al. | 356/401 |
| 5,216,257 | 6/1993 | Brueck et al. | 250/548 |
| 5,216,724 | 6/1993 | Suzuki et al. | 355/201 X |
| 5,260,725 | 11/1993 | Hammond | 346/157 |
| 5,278,625 | 1/1994 | Charnitski et al. | 355/326 R |
| 5,287,162 | 2/1994 | de Jong et al. | 355/326 R |

*Primary Examiner*—Robert B. Beatty

[57] ABSTRACT

The present invention is directed to a precise method of registering images on a photoreceptor belt. At least one coded charge pattern is formed in the photoreceptor belt, outside the image area. A charge sensor is positioned above the belt and in the process direction alignment with the pattern. The sensor has an identical pattern formed on the sensing surface. As the coded pattern advances beneath the charge sensor, a correlation signal is generated when the two patterns are exactly aligned. This correlation signal is used to generate a precisely timed line sync signal which is reproducible through each of the imaging stations to produce registration of the first scan line of each image sequence with a very high degree of accuracy. When two coded patterns and two sensors are used, image skew correction signals are generated and used to correct for skew registration errors.

8 Claims, 2 Drawing Sheets

APPARATUS FOR REGISTERING IMAGES IN A XEROGRAPHIC SYSTEM

BACKGROUND AND MATERIAL DISCLOSURE STATEMENT

The present invention relates generally to a xerographic system, and, more particularly, to a system which incorporates a photoreceptor belt having a coded registration pattern on the surface thereof whose location is precisely detected for image registration purposes.

High speed copiers and digital printer machines typically employ a photoreceptor belt as the imaging media since the belt can provide significantly more area to form a plurality of latent images during a single pass or revolution when compared to a machine with a photoreceptor drum as the imaging surface. In a color copier, for example, a plurality of image exposures are formed, developed and transferred to an output paper sheet in either a single or multiple pass mode, to form a composite color output image. The position of the belt during operation must be known with a great deal of precision since the system timing control must ensure that the images are formed within preselected frames on the photoreceptor surface and each subsequent image is superimposed (registered) with previously formed images. The image exposures must be coordinated with the development, transfer and paper feeding functions. Registration errors occur because the belt is subject to changes in physical size and its rotational speed may vary because of mechanical wear and mechanical tolerances in the drive components. These errors are manifested in the output copies which may exhibit color separation, color bleeding and/or other defects which make the output copies unsuitable.

Various techniques have been developed in the prior art to compensate for these errors. One such method is to form holes or slits in the surface of the belt in non-image areas. The belt surface is illuminated with a light beam and light passing through the holes is sensed by a photodetector. Output signals from the photodetector are used to provide registration signals to register images on the belt in the process and cross process or scan direction and to correct for image skew. Another method is to form registration marks on the surface of the belt, either at manufacture or by exposing the belt in non-image areas to form the mark. The latent image of the mark can then be sensed or, alternatively, the latent image of the mark can be developed and sensed in conjunction with an illumination source or image detector.

The following patents are illustrative of these prior art registration techniques.

U.S. Pat. No. 5,175,570 discloses a color image forming apparatus which forms registration marks 1a, 1b, either as holes formed in the belt or as marks formed on the belt surface. The marks are then sensed and used to adjust the position of the latent image.

U.S. Pat. No. 5,208,633 discloses an imaging system which determines belt position by detecting illumination directed through fiducial openings in the belt.

U.S. Pat. 5,208,796 discloses a color system which detects the passage of either holes formed in the belt surface or marks formed on the belt surface to generate transverse error correction signals.

For these prior art systems, the instantaneous position of the hole or mark is sensed. Exact determination of the center or edge of the hole or mark within the desired accuracy of plus or minus 5–10 microns is difficult because of the "noise" factor. Noise is attributable to stray light, variations in the registration mark and the distance between the photoreceptor belt and the detector. Also, for those systems using a laser Raster Output Scanner (ROS) as the imager, additional noise is created by asymmetry in beam shape, variation in the intensity of the laser source, and wobble of the rotating polygon. Another disadvantage of those techniques relying on hole detection is the belt degradation resulting from formation of the holes or slits; the belts tend to fray or tear during the hole-forming process or at the hole locations during use.

According to the principles of the present invention, a coded registration pattern is formed on the photoreceptor surface in a non-image area. A coded sensor incorporates a set of conductive strips formed in the same registration pattern. The sensor is set above the belt in a position to sense the coded registration pattern as it passes beneath. The sensor capacitively senses the coded latent image of the registration pattern and generates a signal which has a high correlation when the two patterns are exactly aligned. This signal (or plurality of signals when more than one sensor is used) generates signals for registration of the belt in the process, cross process and skew directions. These signals are much more accurate than the "noisy" signal generated by the prior art techniques and avoid the need to form openings in the belt with a resulting stress and fracture possible.

In a first embodiment, a coded line pattern is formed as a charge pattern latent image on one edge of a photoreceptor belt in a non-image area. The pattern can be formed as a latent image by the system imager, or laid down by an ion printhead or a separate image generator. In the latter two cases, the charge pattern may be applied to either the image side or the non-image side of the belt. Alternatively, the pattern may be coded on the surface permanently or periodically and charged by, for example, the charge corotrons of the electrophotographic system. A sensor is aligned in the process direction of the belt so that the coded pattern will pass there beneath. The coded charge pattern is capacitively coupled to the sensor, and when the pattern is exactly aligned with the sensor pattern, a coincidence signal is detected and used for both start of image registration as well as lateral registration. In a second embodiment, two coded patterns are formed at opposite sides of the belt. Two associated sensors generate correlation signals which can be compared to provide a correction signal for any skew in the belt or the image.

More particularly, the present invention relates to an electrographic printer, which incorporates a photoreceptor member which moves along a preselected path in a process direction, imaging means for forming at least one image with a plurality of scan lines on the surface of said member, means for forming at least one coded registration pattern on the surface of said member, sensor means having a duplicate of said registration pattern formed on its sensing surface, said sensor fixed in position so as to be in periodic alignment with said coded pattern as said member moves in the process direction and to produce, by capacitive coupling, output electrical signals upon detection of said coded pattern passing there beneath and circuit means connected to the output of said sensor means for generating an output registration signal when said coded registration pattern is exactly aligned with said sensor means registration pattern.

DESCRIPTION OF THE INVENTION

Figure 1:
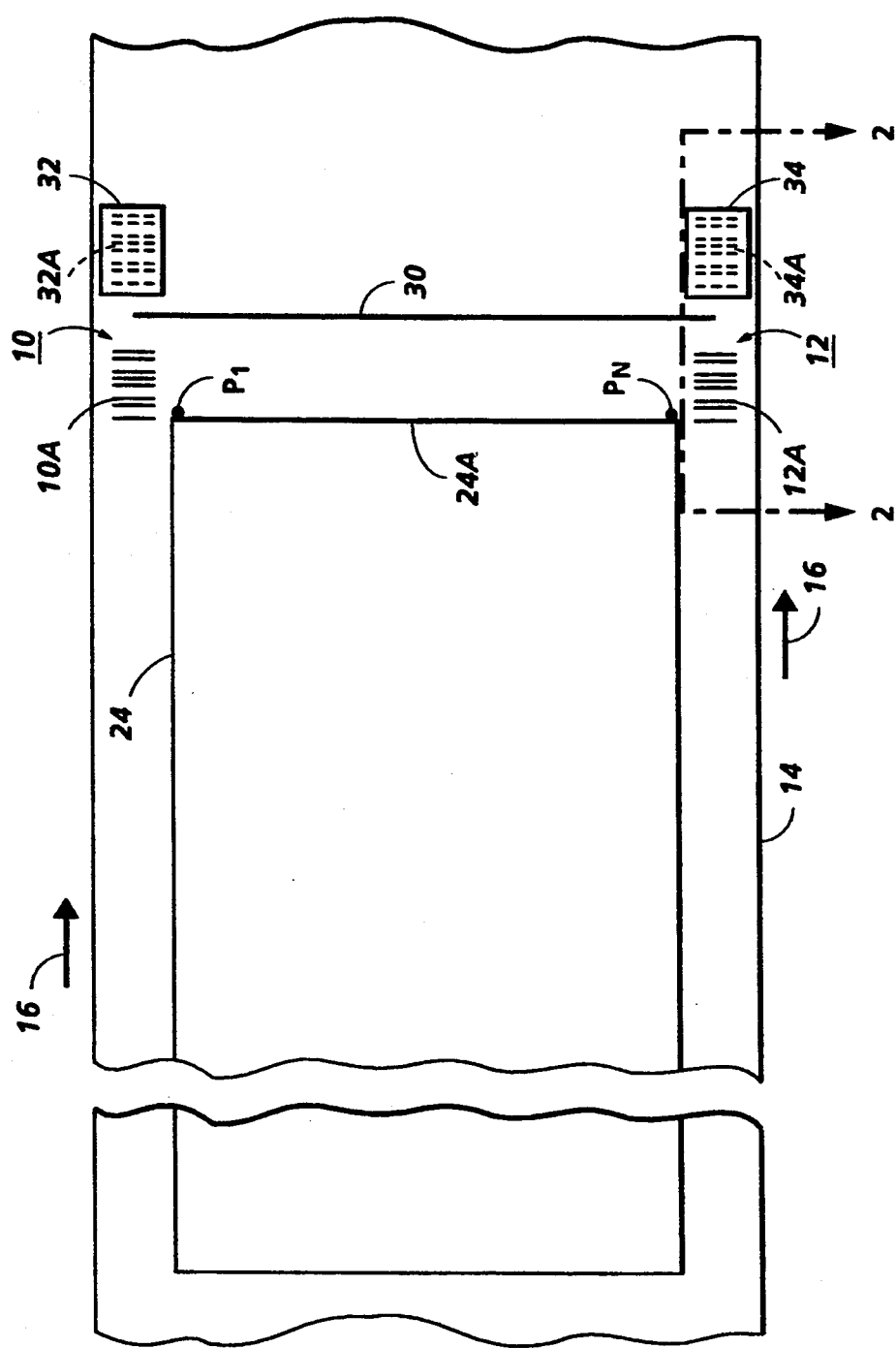
FIG. 1 is a top view of a portion of a photoreceptor belt having coded registration patterns formed thereon.
Figure 2:
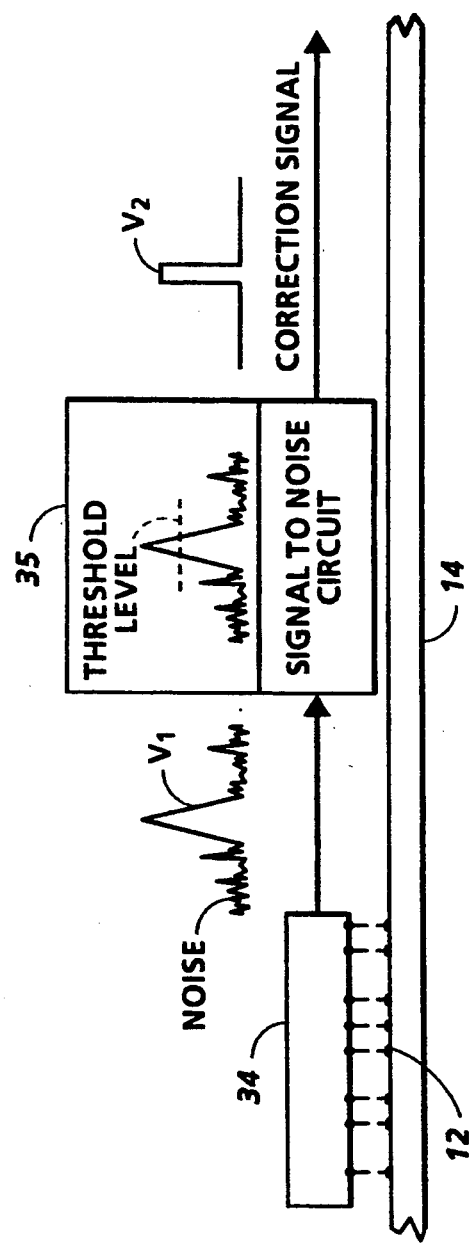
FIG. 2 is a side view showing a coded registration pattern aligned with a sensor having the same registration pattern.

The invention, in a preferred embodiment, is practiced in a color printer of the type disclosed in co-pending application Ser. No. 07/930,642, now U.S. Pat. No. 5,394,223 whose contents are hereby incorporated by reference. In FIG. 4 of that application, a color printer is shown which includes raster output scan (ROS) imaging stations. The ROS performs the function of creating the output image copy on a photosensitive surface of the belt by successively scanning the belt surface with a series of modulated scan lines, each line having a certain number of pixels per inch to form the latent images, which are subsequently developed, transferred to an output sheet and fused. The process may be used in either a single pass system wherein a plurality of imagers and developing and charging stations are used or in a multiple pass system where a single imager station forms images which are developed and returned for further imaging and development. The ROS is also controlled to form latent registration images outside of the image frame. In a preferred embodiment, these latent images remain undeveloped in the present invention and are capacitively coupled to a sensor as will be seen. It is also possible to sense developed images which retain some non-developed charge. Using the ROS and the control electronics described in the aforementioned application, and referring to FIG. 1 of the present invention, a pair of coded registration patterns 10, 12 are formed on the surface of the belt 14 moving in the direction of arrow 16. Each pattern is formed outside of the image area and in a space preceding the first scan line 24A of a first image line frame 24. Each pattern comprises charged line segments 10A, 12A. The remainder of the pattern area has been discharged. Each line segment has a minimum width the equal of one bit line written by the ROS. Many pattern configurations may be chosen; the one shown is merely illustrative. The pattern was formed by controlling the ROS to write a series of one bit on, one off, three on, one off, two on. Sensors 32 and 34 are positioned above the surface of the belt and in line with the path of motion of patterns 10, 12, respectively. Sensors 32, 34 have a conductive line pattern 32A, 34A (shown dotted since not visible from above) formed on the bottom surface of the sensor identical in all respects with the pattern 10A, 1013. The trailing line segment of sections 10 and 12, for this embodiment, are made coincident with the center of the first line 24A of frame 24. The first image pixel P1 of line 24A is formed after a predetermined time delay associated with a signal from a conventional start of scan (SOS) sensor (not shown) positioned above the belt surface. Pixel Pn is the last image pixel of line 24A. It is assumed that the system registration requirement is for subsequent color images to be superimposed on the first exposed and developed image frame 24 within a ±5–10 micron tolerance. A scanning beam from the ROS sweeps across the surface of belt 14 to repeatedly form a succession of scan lines 30. It is understood that the scanning beam is unmodulated in non-image areas and is modulated in image areas to form a latent color image for each color separation. The ROS imaging station has associated with it the pair of charge sensitive sensor heads detectors 32, 34 positioned above the surface of the belt and in line with the path of motion of pattern 10, 12. Because of the capacitive coupling of latent image patterns 10, 12 to the conductive line pattern on sensors 32, 34, a signal output $V_1$ will be generated by the sensor as each pattern 10, 12 passes there beneath. Information about the time each charge pattern 10, 12 passes beneath the associated sensors 32, 34 is directly available from each sensor. Because of the capacitive coupling of the charged pattern (segments 10A, 12A) to the conductive pattern 32A, 34B, a signal output will be generated as the charged pattern passes beneath sensors 32, 34. This output will consist of noise spikes surrounding a coincidence spike pulse $V_1$. The output from the sensor is processed in a signal to noise circuit 35 to detect the point of maximum alignment of the pattern ($V_1$). A high correlation occurs when the charged line pattern is exactly aligned with the sensor pattern with a low noise signal preceding and following the exact alignment. At the point of maximum alignment of the pattern, $V_1$ (FIG. 2) is generated as an output by circuit 35. The signal $V_1$ can be generated either as a combination of signals from the two sensors or as independent signals in separate circuits from either sensor. Signal to noise ratios of from 5/2 to 3/1 are sufficient to provide correlation of the input signals $V_1$ and identify $V_2$. And, with the appropriate choice of patterns, the noise around the main overlay (correlated) signal can be made flat or chosen to provide the optimum signal to noise level. This output signal $V_2$ can then be used for a variety of registration purposes. The correlation signal for sensor 32 is used to generate a start of page (line sync) signal to control printing of the first line of the next image.

The start of page registration can be considered as using slow scan (process direction) coordinates to determine the position of the start of the page. The start of the image (pixel P1) can be considered the fast scan and requires a fast scan coordinate. In an asynchronous clock system, the system clock is triggered so that pixel P1 is laid down after the same delay from pattern 10 detection used in the first exposure station. The end of scan coordinate (pixel Pn) can be located using detection of pattern 12 by sensor 34, in conjunction with an end of scan (EOS) sensor (not shown).

In addition to the start of page and fast scan registration, a skew registration can also be accomplished. The ROS imager is positioned to scan in a straight line laterally across the belt. However, in the case of successive ROS imager stations which are skewed with respect to each other, the scan lines for each station are formed at different angles causing a skewed output image. Skew can result, for example, from twisting of the ROS frame or from unequal stretching of the photoreceptor belt. Skew registration is enabled by comparing the correlation signals from sensors 32, 34. If they are not coincident in time, a skew error signal is generated and skew correction is implemented using techniques disclosed, for example, in copending application Ser. No. 970,889 now U.S. Pat. No. 5,278,587 assigned to the same assignee as the present invention. If the printer is configured as a color printer with frame 24 the first color image formed in a multiple pass system, successive color images will be registered by detecting the same pattern. If the printer operation is a single pass system, each image frame is detected and registered with an associated registered pattern.

Coded patterns having differing signal to noise returns may be selected according to system requirements. The pattern of noise around the main correlation signal can be made to have a high signal to noise ratio to enable positive confirmation and detection of the correlation signal.

While the above description used a ROS embodiment as the imager, the invention can also be practiced with an LED printbar as the imager with a charge pattern being formed by selective activation of the LED diodes. Alternatively, an ion head could be used as the pattern-forming device. The conductive pattern can also be imprinted or attached to the belt at manufacture and then connected to a voltage source by, for example, brush contact.

It is further understood that the invention is also useful to control timing operation for xerographic stations downstream from the imaging station such as a development and transfer station.

While the embodiment disclosed herein is preferred, it will be appreciated from this teaching that various alternative, modifications, variations or improvements therein may be made by those skilled in the art, which are intended to be encompassed by the following claims:

I claim:

1. An electrographic printer, which incorporates a photoreceptor member which moves along a preselected path in a process direction, imaging means for forming at least one image with a plurality of scan lines on the surface of said member, means for forming at least one coded registration pattern on the surface of said member, sensor means having a duplicate of said registration pattern formed on its sensing surface, said sensor fixed in position so as to be in periodic alignment with said coded pattern as said member moves in the process direction and to produce, by capacitive coupling, output electrical signals upon detection of said coded pattern passing there beneath and circuit means connected to the output of said sensor means for generating an output registration signal when said coded registration pattern is exactly aligned with said sensor means registration pattern.

2. The printer of claim 1 wherein said imaging means is a Raster Output Scanner (ROS) and wherein said coded registration pattern is formed as a latent image by said ROS.

3. The printer of claim 1 wherein said imaging means forms a plurality of color images during a multiple pass operation, said color image being formed in overlying registration to form a composite color image.

4. The printer of claim 1 wherein said imaging means forms a plurality of color images during a single pass operation, each of said color images form with a separate set of coded registration patterns, said color images formed in overlying registration to form a composite color image.

5. The printer of claim 1 wherein said imaging means is an ion head.

6. The printer of claim 1 wherein said output registration signal is used to control the operation of the imaging means to register color images in a process and scan direction.

7. The printer of claim 1 wherein said output registration signal is used to control the operation of the imaging means to correct for skewed output images.

8. The printer of claim 1 wherein said printer includes means for developing said image formed by said imaging means and for transferring said developed image to an output sheet, said output electrical signals controlling timing operation for said developing and transfer means.

* * * * *